(12) United States Patent
Lamb et al.

(10) Patent No.: US 8,312,027 B2
(45) Date of Patent: Nov. 13, 2012

(54) MODULAR QUERY OPTIMIZER

(75) Inventors: Andrew Lamb, Arlington, MA (US); Lakshmikant Shrinivas, Billerica, MA (US); Shilpa Lawande, Littleton, MA (US); Mitch Cherniack, Chelsea, MA (US); Nga Tran, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/489,094

(22) Filed: Jun. 5, 2012

(65) Prior Publication Data

US 2012/0246147 A1 Sep. 27, 2012

Related U.S. Application Data

(62) Division of application No. 12/625,482, filed on Nov. 24, 2009, now Pat. No. 8,214,352.

(60) Provisional application No. 61/118,370, filed on Nov. 26, 2008.

(51) Int. Cl.
*G06F 17/30* (2006.01)

(52) U.S. Cl. ........ 707/752; 707/753; 707/713; 707/714; 707/718

(58) Field of Classification Search .................. 707/713, 707/714, 718, 752, 753
See application file for complete search history.

(56) References Cited

U.S. PATENT DOCUMENTS

| | | | |
|---|---|---|---|
| 6,356,891 B1 * | 3/2002 | Agrawal et al. | 1/1 |
| 6,366,903 B1 * | 4/2002 | Agrawal et al. | 1/1 |
| 6,865,567 B1 | 3/2005 | Oommen et al. | |
| 7,076,477 B2 * | 7/2006 | Lin et al. | 1/1 |
| 7,277,873 B2 * | 10/2007 | Brown et al. | 706/45 |
| 7,363,299 B2 * | 4/2008 | Dalvi et al. | 1/1 |
| 7,366,716 B2 | 4/2008 | Agrawal et al. | |
| 7,457,797 B2 * | 11/2008 | Bestgen et al. | 1/1 |
| 7,546,306 B2 | 6/2009 | Faerber et al. | |
| 7,630,967 B1 | 12/2009 | Srivastava et al. | |
| 7,774,336 B2 | 8/2010 | Beyer et al. | |
| 7,908,242 B1 * | 3/2011 | Achanta | 707/602 |
| 2003/0115183 A1 * | 6/2003 | Abdo et al. | 707/3 |

(Continued)

FOREIGN PATENT DOCUMENTS

WO  WO-2008016877 A2  2/2008

OTHER PUBLICATIONS

Pirahesh, H., et al.; "Extensible/Rule Base Query Rewrite Optimization in Starburst" Proceedings of the 1992 ACM SIGMOD International Conference on Management of Data ACM SIGM.

(Continued)

*Primary Examiner* — Frantz Coby

(57) ABSTRACT

Computer programs encoded on a computer storage medium provide for a modular query optimizer. In one aspect, a computer program product includes selecting one or more projections from a set of projections for each table in a database query wherein each of the selected projections for the table has leads to an estimated lower execution cost for the query as compared to non-selected projections; generating join orders for the query based on data distribution of one or more of the selected projections among sites in a computer network wherein the join orders reflect different combinations of data distribution operations applied to the output of one or more of the query's joins; and selecting a join order from the join orders based on evaluation of the join orders using a cost model.

16 Claims, 12 Drawing Sheets

U.S. PATENT DOCUMENTS

| | | |
|---|---|---|
| 2004/0003132 A1* | 1/2004 | Stanley et al. .................. 709/316 |
| 2004/0260675 A1 | 12/2004 | Bruno et al. |
| 2005/0097072 A1* | 5/2005 | Brown et al. ....................... 707/1 |
| 2006/0206477 A1* | 9/2006 | Dalvi et al. ......................... 707/5 |
| 2006/0253473 A1 | 11/2006 | Agrawal et al. |
| 2007/0136317 A1 | 6/2007 | Przywara |
| 2007/0192343 A1 | 8/2007 | Faerber et al. |
| 2009/0030888 A1* | 1/2009 | Sahu et al. ......................... 707/5 |
| 2009/0055350 A1 | 2/2009 | Branish et al. |
| 2009/0070313 A1* | 3/2009 | Beyer et al. ....................... 707/5 |
| 2009/0327216 A1* | 12/2009 | Brown et al. ...................... 707/2 |
| 2010/0042581 A1 | 2/2010 | Srivastava et al. |
| 2011/0035368 A1 | 2/2011 | Cole et al. |
| 2011/0060731 A1 | 3/2011 | Al-Omari et al. |

OTHER PUBLICATIONS

Selinger, P.G., et al.; "Access Path SDelection in a Relational Database Management System. Proc. ACM SIGMOD Conf."; Boston, MA; May-Jun. 1979; pp. 23-34.

* cited by examiner

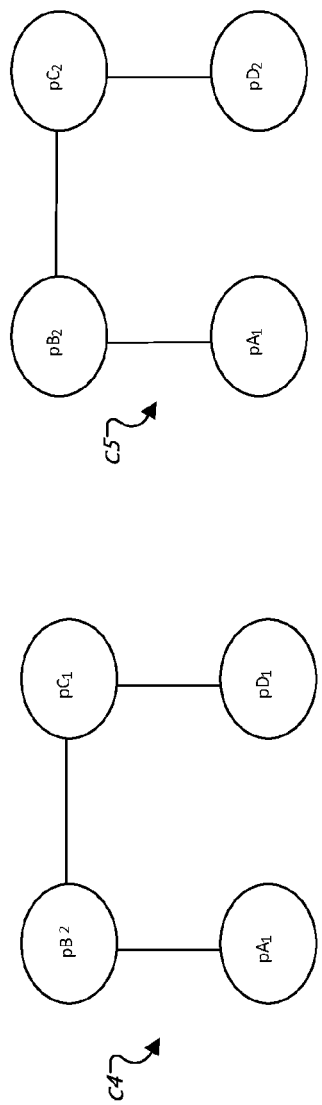
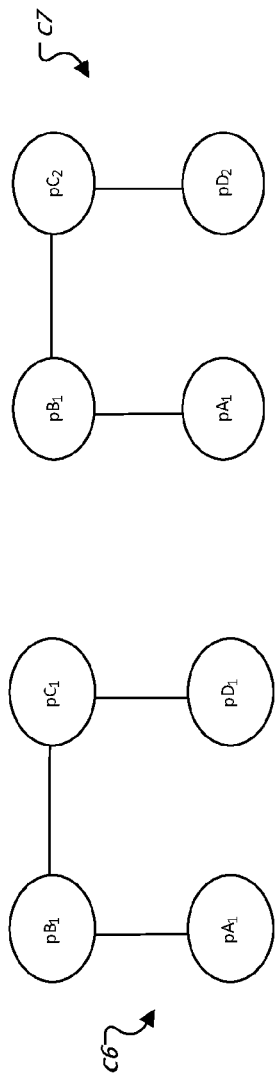
FIG. 3G
FIG. 3H

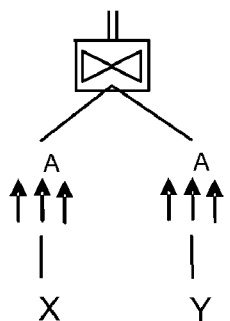
FIG. 4C
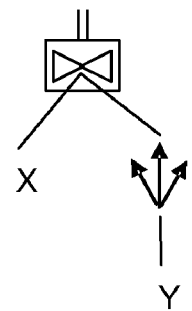
FIG. 4D
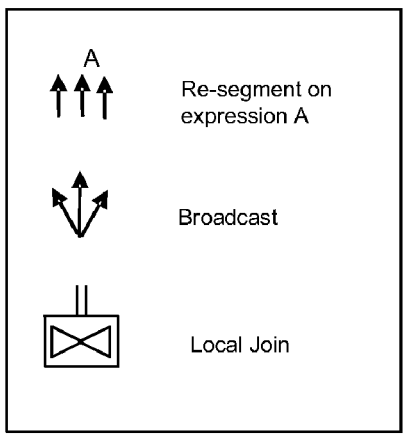

MODULAR QUERY OPTIMIZER

CROSS-REFERENCE TO RELATED APPLICATIONS

This application is a divisional and claims the benefit under 35 U.S.C. §120 of U.S. patent application Ser. No. 12/625,482, filed Nov. 24, 2009, now U.S. Pat. No. 8,214,352. In turn, U.S. patent application Ser. No. 12/625,482 claims the benefit under 35 U.S.C. §119(e) of U.S. Patent Application No. 61/118,370, entitled "Query Optimizer," filed Nov. 26, 2008. All of these previous applications are incorporated herein by reference in their respective entireties.

BACKGROUND

This specification relates to database query optimization. Query optimizers are used by database management systems to determine or identify efficient plans for executing queries. Estimating the cost for executing a query plan typically includes determining an expected number of input/output operations and an estimate of the processing time required to perform the plan. Query optimizers can represent queries to be optimized, such as an Structured Query Language (SQL) queries, as join graphs where tables in SQL FROM clauses are represented as vertices in the join graph. Join predicates between tables are represented as edges between vertices in the join graph.

SUMMARY OF THE SPECIFICATION

With limitation of the scope of the claims, the following summarizes the present specification. In general, one aspect of the subject matter described in this specification can be embodied in a method that includes: for each table in a database query, selecting one or more projections that reduce an estimated cost for executing the query for the table, based on a segmentation or sort order of the selected projections; based on a data distribution of one or more of the selected projections among sites in a computer network, generating, for the query, possible join orders that represent different combinations of data distribution operations applied to the outputs of one or more of the query's joins; and evaluating the join orders based on a cost model. Other embodiments of this aspect include corresponding systems, apparatus, and computer program products.

These and other aspects can optionally include one or more of the following features. The estimated execution cost for the query can be based on whether the selected projections allow for one or more local joins in an execution plan for the query. In a join order, many-to-one joins can occur before many-to-many joins. In a join order, more selective joins can occur before less selective joins. A local join in a join order that occurs before a subsequent join that would destroy the locality of the local join can be given the same order as the subsequent join. A data distribution operation can be at least one of: re-segmentation according to a join key, broadcast, and filtering on a join key. A join order can be selected based on the evaluation. Selecting a join order can further comprise selecting the join order with the lowest cost.

In general, another aspect of the subject matter described in this specification can be embodied in a method that includes providing a join classifier to a join order generator wherein the join classifier is configured to classify joins in a database query; providing a join ranker to the join order generator wherein the join ranker is configured to rank each join based on the join's respective category; using, by the join order generator, the provided join classifier and the join ranker to produce join plans in order of join ranks; and wherein the database is a column-oriented database, a row-oriented database, or a hybrid row and column oriented database. Other embodiments of this aspect include corresponding systems, apparatus, and computer program products.

These and other aspects can optionally include one or more of the following features. A join category can be one of join constraint, join selectivity, and join output size. The query can be provided to a projection set generator wherein the projection set generator is configured to provide projection sets for the query to the join order generator for use in determining the join plans. A projection set can be determined based on physical properties of the projection set's projections. The join plans and a cost model can be provided to a cost predictor wherein the cost predictor is configured to use the cost model to select a lowest cost join plan in the join plans for executing the query. The database can be a distributed database. Data in the database can be distributed by one or more of replication and segmentation.

Particular embodiments of the subject matter described in this specification can be implemented so as to realize one or more of the following advantages. A query optimizer is described that is able to optimize queries using an arbitrary mix of inner and outer joins. The query optimizer is modular allowing for different projection set generators, join classifiers, join rankers, and cost predictors to be used. The join classifier and join ranker are used together to limit the size of the search space of join orders considered by a cost predictor. The query optimizer can be used with column oriented databases, hybrid row and column databases, distributed databases where data has been replicated and/or segmented, and databases that support on-the-fly data replication and re-distribution. Join enumeration strategies can be limited to produce good plans on the average even with unreliable cost models. The query optimizer is capable of including data distribution information in the join enumeration strategies. The projection set generator can select projections based on their physical properties. Different cost models can be used at different phases of query optimization. The projection design can include arbitrarily segmented or replication projections.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4C-D illustrate examples of join plans.

Like reference numbers and designations in the various drawings indicate like elements.

DETAILED DESCRIPTION

Figure 1A:
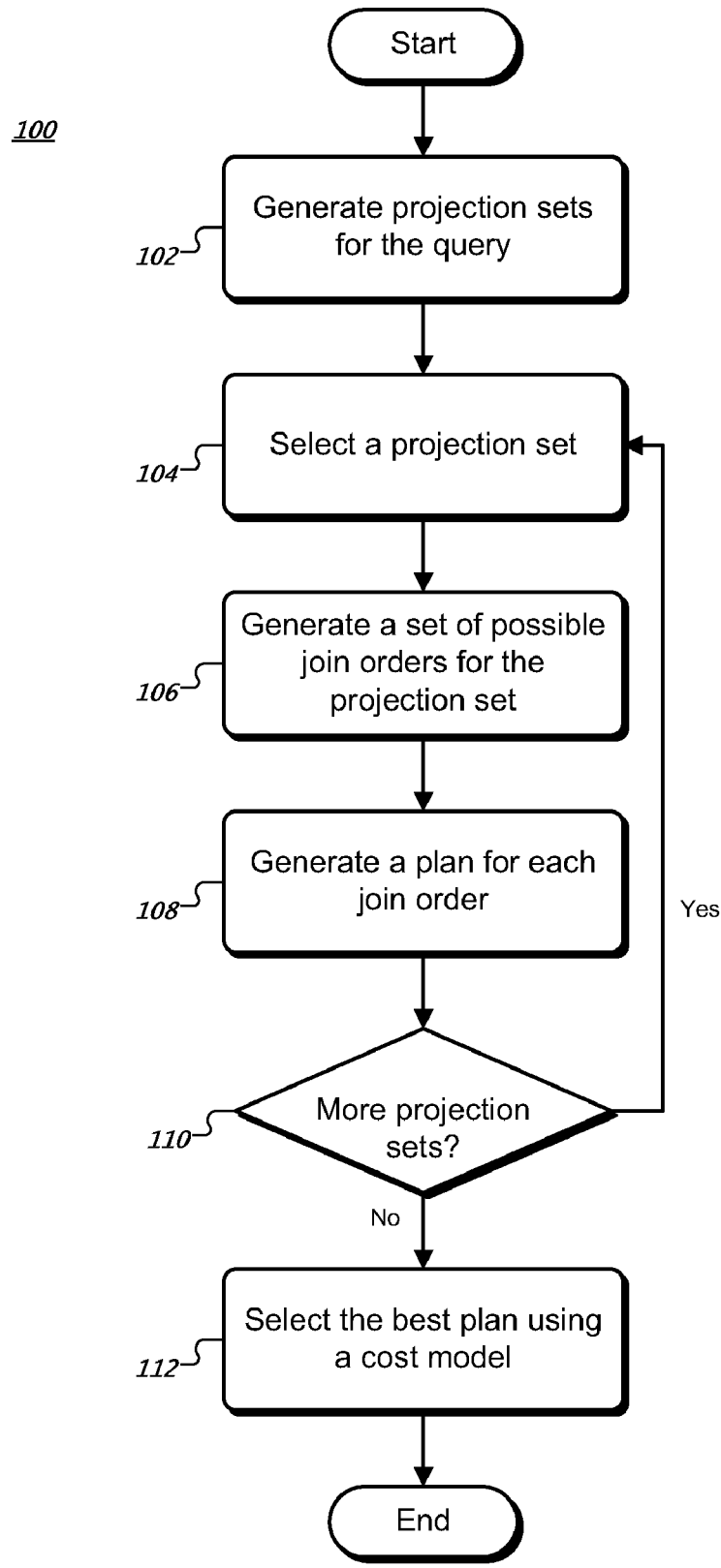
FIG. 1A is a flow diagram of an example technique for query optimization.

FIG. 1A is a flow diagram of an example technique 100 for query optimization. This flow diagram serves to provide an overview and will be discussed with reference to FIG. 1B. Specific query optimizer components will be described in detail further below. The query can be represented as a join graph 116; however other representations of queries are possible. A projection set generator 118 generates candidate projection sets 120 (step 102) for a query. A projection is a table, view or materialized views of the table that includes all the columns requested by the query. In some implementations, a projection may be stored in a sorted and compressed fashion. In some implementations, the projection set generator 118 is configured for a column oriented database. Other project set generators are possible, however, including projection set generators for row oriented databases and hybrid row and column oriented databases. Each node in the input query's join graph describes a table. The projection set generator 118 determines which projections should be used to fulfill the data requirements of the query represented by the join graph 116. The output of the projection set generator 118 is a set of one or more candidate projection sets 120. Each candidate projection set specifies, for each node in the join graph 116, which projection to use to supply the columns of that table. One of the projection sets 120 is then selected as input to a join order generator 122 (step 104).

The join order generator 122 takes as input the join graph 116, the selected projection set from step 104, a join classifier 134, and a join ranker 124, and generates a space of join orders 126 for eventual consideration by a cost predictor 128 (step 106). The join classifier 134 classifies joins into categories and the join ranker 124 ranks different types of join categories. Different combinations of join classifiers and join rankers can be provided to the join order generator 122 allowing for a modular approach to join space generation. If there are more projection sets (step 110), the technique continues at step 104. Otherwise, the generated join orders 126 are converted to join plans and provided to the cost predictor 128 (step 108). A join plan is a join order that includes any required data redistribution operations along with other annotations that might be required to execute the plan such as choice of join algorithm (hash, merge, nested loops), etc. Data redistribution is described further below. In addition to the join plans 126, the cost predictor 128 takes as input a cost model 130. The cost model 130 is used by the cost predictor 128 to determine a cost for executing each of the join plans, for example, from which the least costly plan 132 is selected as the optimized version of the query represented by join graph 116 (step 112). Different cost models 130 can be used with the cost predictor 128. Different cost models can be used to optimize for different goals other than for minimum execution time. For example, there could be cost models that minimize the amount of data sent over network connections, the amount of random access memory or disk storage used, the amount of central processing unit time required, and so on.

Projection Set Generator

In various implementations, the projection set generator 118 can consider all possible combinations of projections that cover the tables of join graph 116. By way of illustration, a projection P covers a table T in a query Q if P contains all columns of T used in Q. In general, the search space can be characterized as $O(N^M)$ where N is the number of projections and M is the maximum number of projections that cover any one table. In the worst case, every projection covers every table in the query resulting in $O(N^N)$ possible coverings. In some implementations, the projection set generator 118 chooses the projection sets 120 based on a cost model 144 that takes into account projection column ordering, run-length encoding (RLE) compression, and single table predicates in the query. Other cost models are possible.

In various implementations, the projection set generator 118 heuristically considers projections that would allow for various sorting optimizations. For example, merge join, one-pass aggregation, and so on. In addition, the projection set generator 118 can consider aspects other than sorting optimizations in particular, the ability of a projection to allow local joins higher in the plan. Local joins are joins that do not require the data to be redistributed to sites (e.g., computers) across a network. Formally, these notions are captured by the term physical property. Two projections could have identical data, but very different physical properties—for example, consider a table foo with columns a, b, and c. One projection for foo (foo_p1) might be replicated and sorted by column a, whereas another projection (foo_p2) might be segmented by column b and sorted by column c.

Figure 2A:
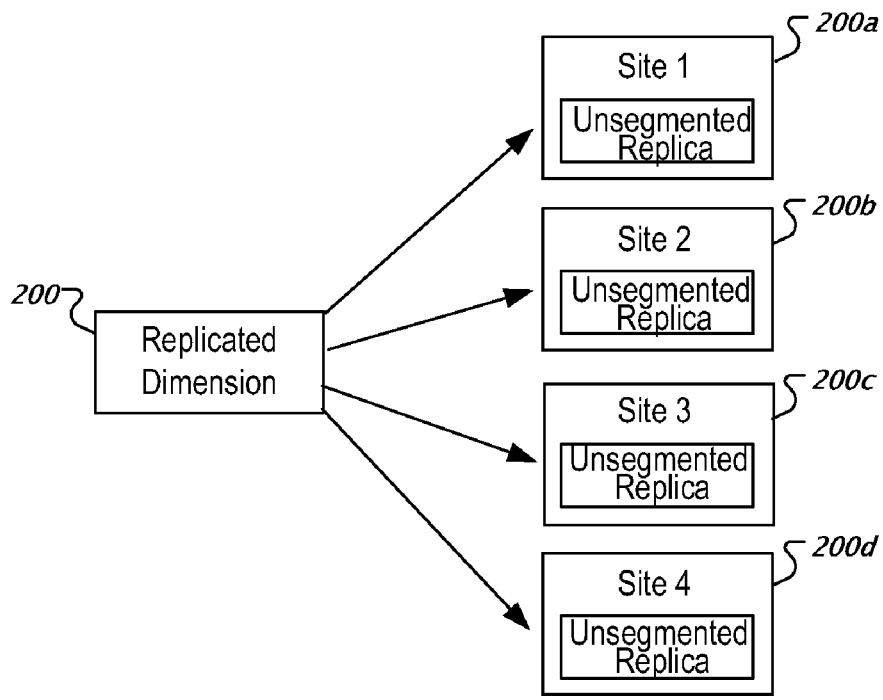
FIGS. 2A-B illustrate a replicated and segmented projection, respectively.
Figure 2B:
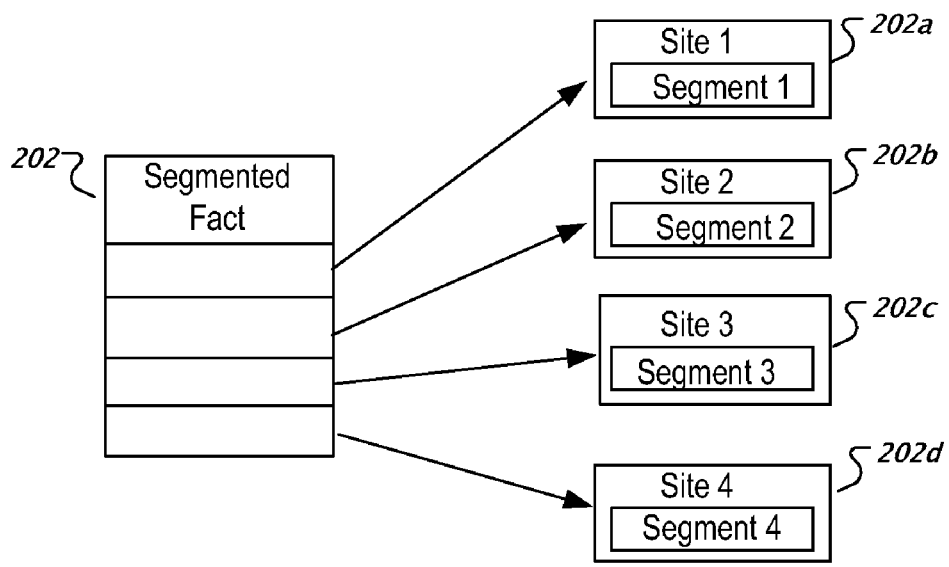

FIGS. 2A and 2B illustrate examples of replicated and segmented projections. With a replicated projection (e.g., 200), a copy of each row in the projection is stored on each site (e.g., 200a, 202b, 202c and 202d) in a cluster on which the projection is replicated. Thus, any site with a replica has an entire copy of the projection. With a segmented projection (e.g., 202), exactly one copy of all rows in the projection is present in a cluster. Each row is stored on exactly one of the cluster sites (e.g., 202a, 202b, 202c or 202d). The storage site is specified by the value of an arbitrary, user-defined expression applied to each row, for example.

By way of illustration, the physical properties of a projection can have a significant effect on the time it takes to process a query with that projection. For example, to process the query:

SELECT * FROM foo ORDER BY a;

If a replicated projection foo_p1 for table foo is used, then no sorting is required and the processing can happen locally on the initiator site. However, if projection foo_p2 which is segmented on b and sorted on c is used, the data will have to be sorted, then shipped to the initiator site and merged before the final output can be produced. Clearly, the processing times will be significantly different for these two cases.

A projection can have many physical properties, not all of which are relevant to query processing. In various implementations, the notion of physical property refers to a property that has the potential to make some operation cheaper. For example, sort orders have the potential to make join and group by operations cheaper (by using Merge Join and Pipelined Group By, respectively). The sort order is the order in which rows of the projection are stored physically on disk. For example, if a projection foo_p has a sort order of x, y, z, the rows are stored on disk such that they can be ready back in that order. Thus, using foo_p for a query of the form:

SELECT x, y, z FROM foo_p ORDER BY x, y, z does not require the data to be sorted (as it is read off disk in that way). Similarly, segmentation has the potential to make certain joins cheaper if the segmentation key is the same as the join key.

In various implementations, the projection set generator 118 heuristics are as follows:

Heuristic 1. For each node in the join graph, keep only the lowest cost projection for each physical property. Note that certain projections could be the cheapest for several physical properties.

Heuristic 2. For each individual edge (join) in the join graph, examine all join choices using all projection choices for the two nodes. Keep only those projection choices that result in the cheapest joins for each physical property of the join output. Note that this heuristic will prune out certain combinations of projections, not necessarily the projections themselves.

In some implementations, the projection set generator 118 uses the same cost model as the rest of the optimizer in order to find the cheapest projection or two table join. Other cost models are possible, however. During subsequent steps, the join ranker is used to decide which join orders are "good", rather than the cost model. Once a candidate set of projections and two-way join combinations (called "best edges") has been identified, projection sets 120 are generated using the following strategy and algorithm (which implements Heuristic 2 above).

At each node in the join graph, if there is a projection that did not make it in any edge emanating from that node, then it is discarded. The reasoning for this is the following: If a projection did not participate in any emanating edge, then the operation that it was hoping to speed up could not be sped up (perhaps because the other side did not cooperate). Hence it is safe to discard it. With this strategy, more combinations than necessary are still generated.

In Heuristic 1, projections that could contribute to a best plan are not discarded. Heuristic 2 involves first using Heuristic 1 to prune some projections, and then using an algorithm for pruning more projection set combinations. A brief pseudo code outline of a function which implements Heuristic 2 and returns a list of projection sets 120 for the join graph 116 is as follows:

Function GenerateCPS (join graph)
Begin
If the join graph is empty, return an empty list.
If the join graph has no edges, return a list of all projection combinations for the nodes in join graph.
Do while there is an unseen best edge with both ends in the join graph:
    Pick an unseen best edge in the join graph, and select one of its end points as the starting node S. (Assume each best edge has a flag called seen/unseen. Initially every best edge is marked unseen.)
    Start growing a spanning tree starting from S, using only best edges. Whenever an edge is added, the original join graph nodes (which are in terms of tables) are replaced with new ones in terms of projections. If there are multiple best edges, there are multiple trees created, however, only trees of maximal size are retained. (For example, if there are multiple trees with 2 nodes, and only 1 of them can be grown to 3 nodes, then only the 3 node tree is retained, discarding the other 2 node trees.) Let these trees be $T_1 \ldots T_k$. During this step, best edges that were considered are marked as 'seen'.
    Partition $T_1 \ldots T_k$ into bins $B_1 \ldots B_m$ according to the original join graph nodes that the trees cover. Thus m<=k.
For each bin $B_i$, 1<=i<=m, do the following:
    Create a new join graph JG' by removing the nodes of $B_i$ from the join graph.
    Recurse: List of projection sets L=GenerateCPS(JG')
    For each tree $T_j$ in $B_i$, and each CPS C in L, create a larger CPS $C_j$ by extending C with the nodes in $T_j$. Add $C_j$ to a list L'. Note that in this step, $|B_i|$ new CPS's are created.
After the while loop has completed, return list L'.
End of function GenerateCPS The above GenerateCPS function ensures that every best edge appears in at least one projection set and that no projection set is repeated in the list of projection sets 120. By way of illustration, consider a query involving joins between four tables A, B, C and D where each table has five projections as shown in TABLE 1A below.

TABLE 1A

| TABLE | PROJECTIONS |
| --- | --- |
| A | $pA_1, pA_2, pA_3, pA_4, pA_5$ |
| B | $pB_1, pB_2, pB_3, pB_4, pB_5$ |
| C | $pC_1, pC_2, pC_3, pC_4, pC_5$ |
| D | $pD_1, pD_2, pD_3, pD_4, pD_5$ |

Figure 3A:
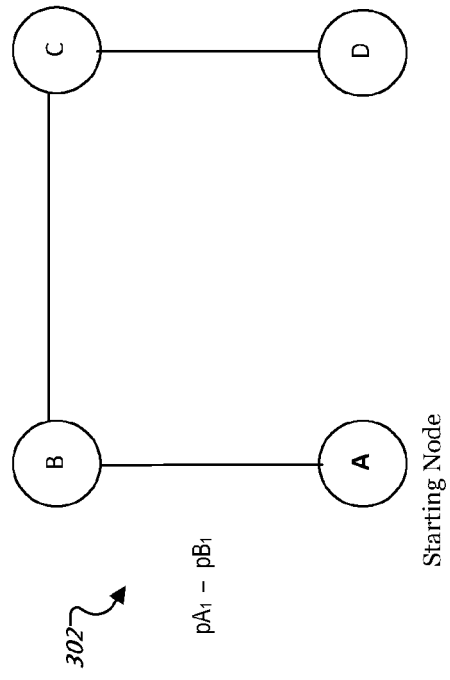
FIGS. 3A-P illustrate an example of generating projection sets for a query.

FIG. 3A illustrates an example input join graph 300 to the projection set generator 118. The join graph of FIG. 3A represents the following query:
SELECT * FROM A, B, C, D
WHERE A.a1=B.b1 AND B.b2=C.c1 AND C.c2=D.d1
Given this query, physical properties listed in TABLE 1B are desired. These properties are created from the query by examining the join predicates.

TABLE 1B

| JOIN PREDICATE | DESIRED PHYSICAL PROPERTIES |
| --- | --- |
| A.a1 = B.b1 | Sorted on attribute a1 |
| | Segmented on attribute a1 |
| | Sorted on attribute b1 |
| | Segmented on attribute b1 |
| B.b2 = C.c1 | Sorted on b2 |
| | Segmented on b2 |
| | Sorted on c1 |
| | Segmented on c1 |
| C.c2 = D.d1 | Sorted on c2 |
| | Segmented on c2 |
| | Sorted on d1 |
| | Segmented on d1 |

Suppose projections $pA_5$, $pB_5$, $pC_5$ and $pD_5$ are not the cheapest projections for any physical property. These are discarded (Heuristic 1). For example, assume that $pA_5$, $pB_5$, $pC_5$ and $pD_5$ were sorted and segmented on attributes a4, b5, c7 and d4 so that they did not satisfy any of the physical properties in TABLE 1B, whereas the other projections satisfied one or more of the properties in TABLE 1B. Suppose the following joins are the cheapest joins for some physical property (we call these "best joins"): $pA_1$ joined to $pB_1$, $pA_1$ joined to $pB_2$, $pB_3$ joined to $pC_2$, $pC_1$ joined to $pD_1$, and $pC_2$ joined to $pD_2$. According to Heuristic 1, $pB_4$, $pA_2$, $pA_3$, $pA_4$, $pC_3$, $pC_4$, $pD_3$, $pD_4$ did not participate in any best join. Hence, these are discarded. The remaining projections under consideration after Heuristic 1 are: $pA_1$, $pB_1$, $pB_2$, $pB_3$, $pC_1$, $pC_2$, $pD_1$, and $pD_2$.

Figure 3B:
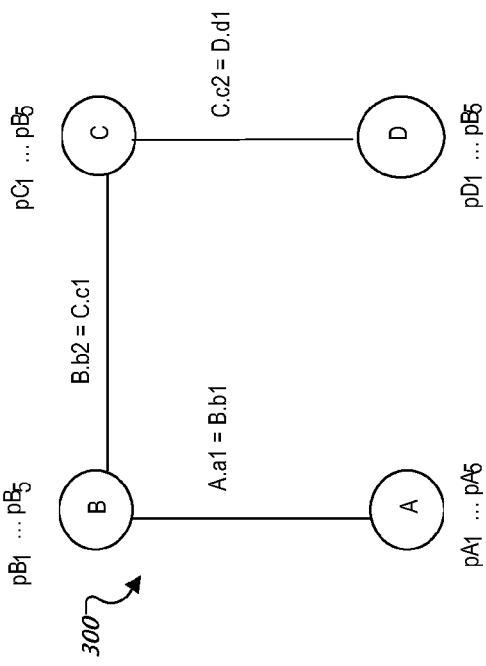
Figure 3C:
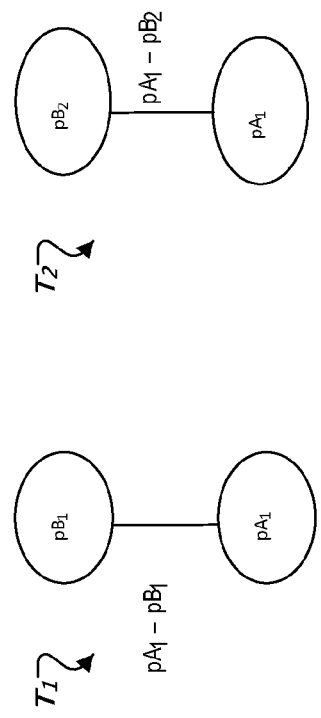

Now, the algorithm GenerateCPS is performed, initially passing in the original join graph 300 shown in FIG. 3A. Edge $pA_1$-$pB_1$ is selected as the unseen edge and A is selected as the starting node (see join graph 302 in FIG. 3B). Two trees are created, tree $T_1$ and tree $T_2$ (see FIG. 3C), since there are two best edges emanating from starting node A, namely $pA_1$-$pB_1$ and $pA_1$-$pB_2$). Edges $pA_1$-$pB_1$ and $pA_1$-$pB_2$ are then marked as "seen". Since both trees cover the same nodes in the join graph, there is only one bin $B_1$, with trees $T_1$ and $T_2$ in it.
$B_1$ {$T_1$, $T_2$} (covering nodes A, B)
In general, there could be more than one bin. For example, if there were a best join between A and D, say $pA_2$-$pD_2$, then there would be bin $B_2$={$T_x$} covering nodes A and D.

Figure 3E:
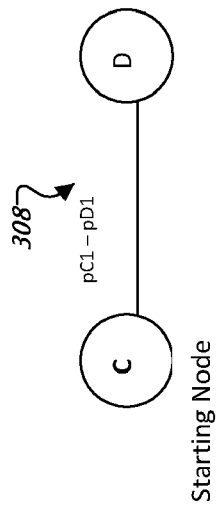
Figure 3D:
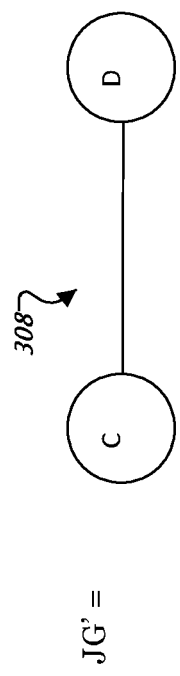
Figure 3F:
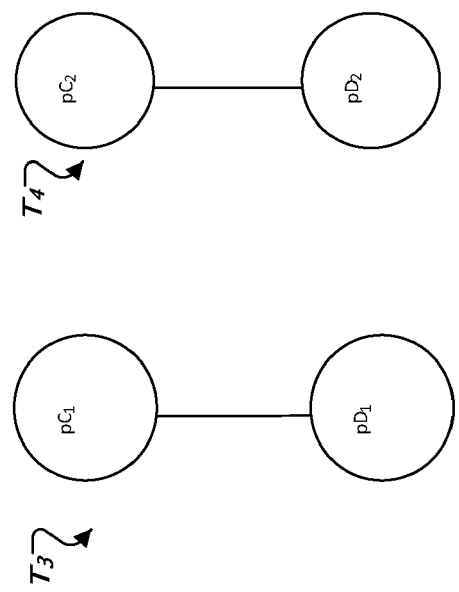

A new join graph JG' 308 (see FIG. 3D) is created by removing nodes in bin $B_1$ (i.e., A and B) from the join graph 302. The GenerateCPS function is then invoked recursively with new join graph JG' 308 as input. Edge $pC_1$-$pD_1$ is selected as the unseen edge and node C is selected as the starting node (see FIG. 3E). Spanning trees $T_3$ and $T_4$ are then created (see FIG. 3F). There is just one bin, $B_1 = \{T_3, T_4\}$, covering nodes C and D.

A new join graph JG' is empty since nodes C and D (from $B_1$) have been removed from the join graph. The GenerateCPS function is then invoked recursively again with an empty list of join graphs.

Covering project sets $C_1$ and $C_2$ (FIG. 3G) are created from $T_3$ and $T_4$ by extending the empty set. The projection sets are added to list L'=$\{C_1, C_2\}$. Since there are no more unseen edges with both ends in the join graph, GenerateCPS returns L'. Next, projection sets $C_4$, $C_5$, $C_6$ and $C_7$ are created by extending $C_1$ and $C_2$ with trees $T_1$ and $T_2$. (see FIG. 3H). The set of projections L' then becomes $\{C_4, C_5, C_6, C_7\}$.

Figure 3J:
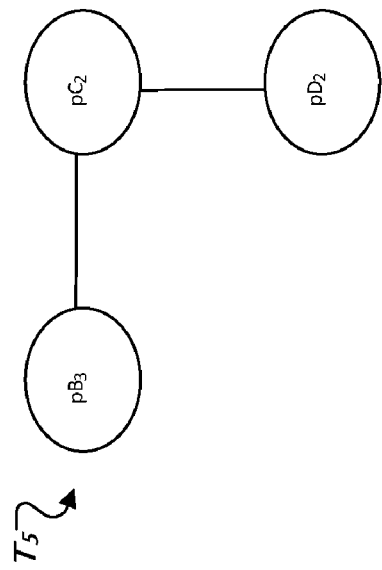
Figure 3I:
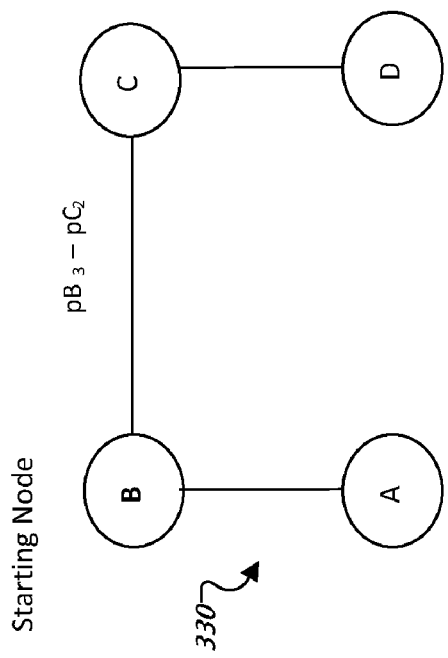
Figure 3L:
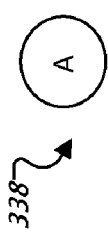
Figure 3K:
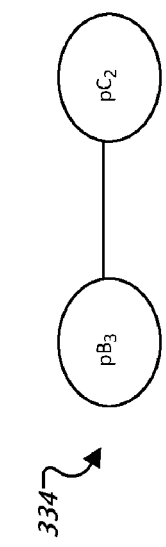

There remains one more unseen best edge with both ends in the join graph, namely $pB_3$-$pC_2$. The selected best edge is $pB_3$-$pC_2$ and the starting node is selected as B (see FIG. 3I). One spanning tree $T_5$ is created starting from node B and using only best edges (see FIG. 3J). (Note: tree 334 in FIG. 3K is also a valid tree, but the algorithm only retains trees of maximal size). There is just one bin $B_i$ equal to $\{T_5\}$, covering nodes B, C, D.

Figure 3O:
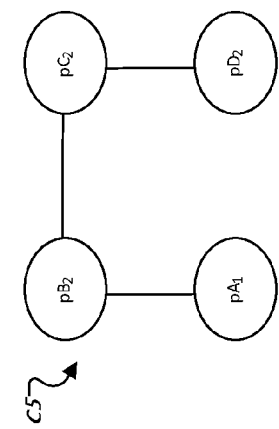
Figure 3O:
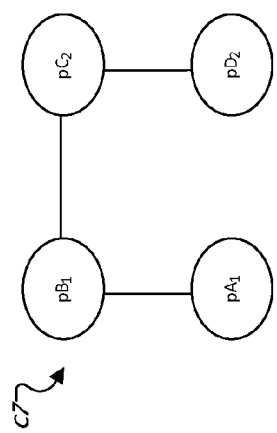
Figure 3O:
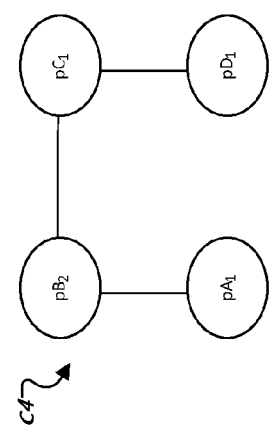
Figure 3O:
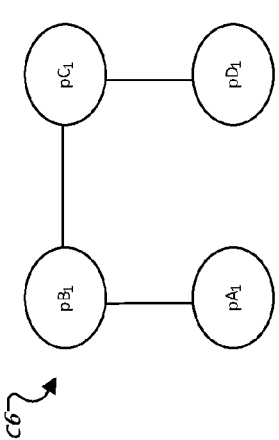
Figure 3O:
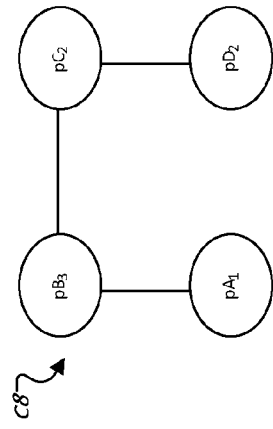
Figure 3M:
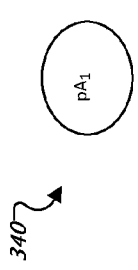
Figure 3N:
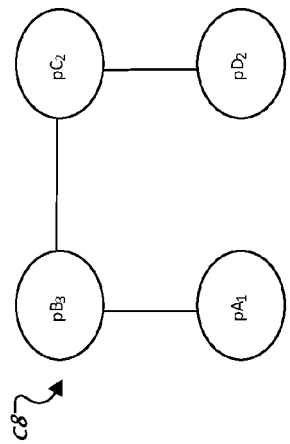
Figure 3P:
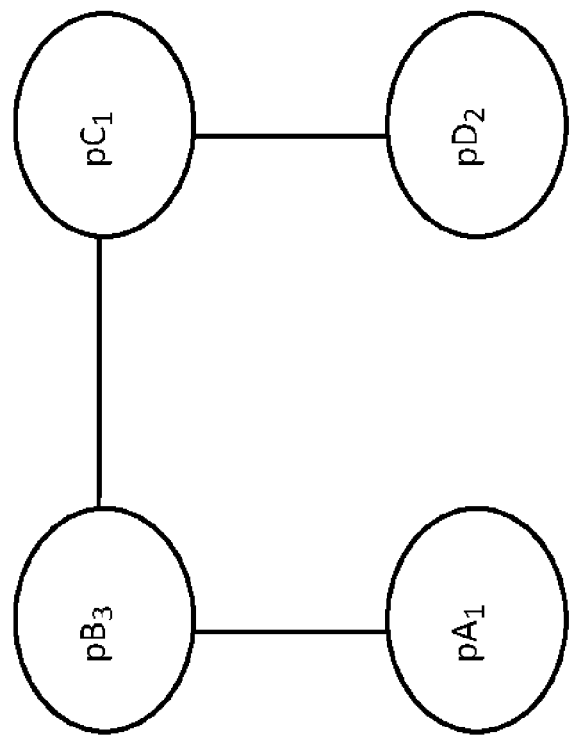
Figure 3P:
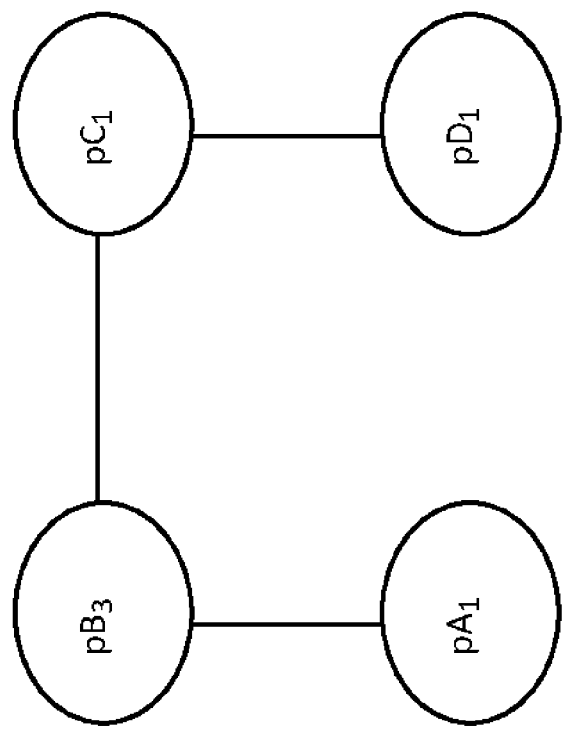

A new join graph JG' 338 is created and equal to node A (see FIG. 3L), since nodes B, C and D have been removed. The GenerateCPS function is then invoked recursively again with the new join graph JG' 338. The list L is then set to $\{pA_1\}$ (see FIG. 3M). (Recall that $pA_2$, $pA_3$, $pA_4$ and $pA_5$ were discarded since they did not participate in any best join). Projection set $C_8$ is then created by extending with $T_5$ (see FIG. 3N). $C_8$ is added to list L' and list L' becomes $\{C_4, C_5, C_6, C_7, C_5\}$. Thus, the final set of projection sets is shown in FIG. 3O. Note that the projection sets shown in FIG. 3P and many others were not generated. Indeed, all combinations of the projections remaining after Heuristic 1 would total $4^4=256$ projection sets (since each of the 4 nodes had 4 possible projection choices) instead of just five.

Join Classifier

Figure 1B:
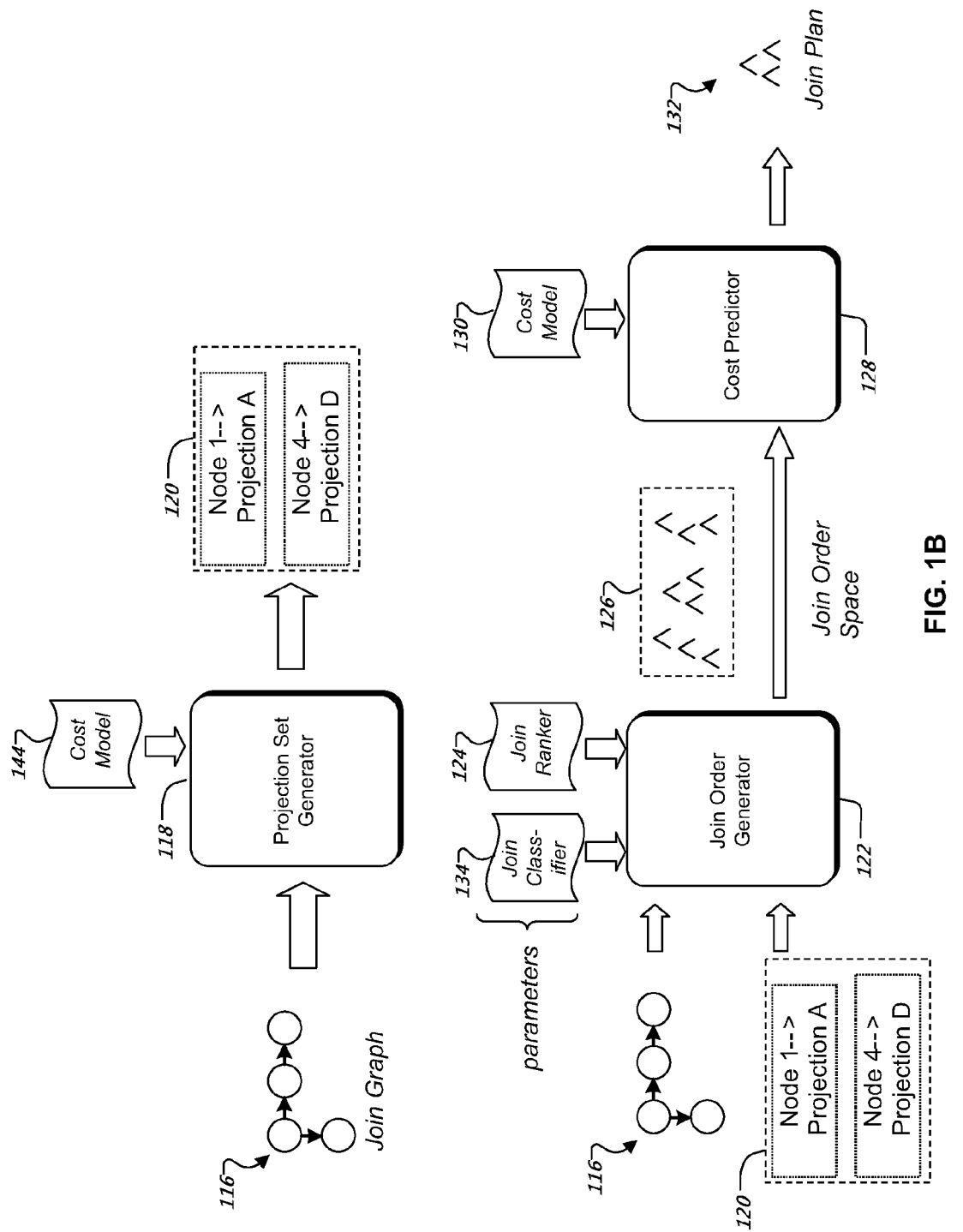
FIG. 1B illustrates an example query optimizer system.

Recall from FIG. 1B that the join order generator 122 is configured to use a join classifier 134 and a join ranker 124. Because of the modular nature of the join order generator 122, both the join classifier 134 and the join ranker 124 can be substituted with other classifiers and rankers without requiring changes to the join order generator 122. The join classifier 134 classifies joins (e.g., vertices) in the join graph 116 into categories. Many such classifiers are possible. In some implementations, the join classifier 134 classifies joins according to the categories in TABLE 2.

TABLE 2

| JOIN CATEGORY | CATEGORY VALUES |
|---|---|
| Constraint | Many to one join (e.g. along a foreign key-primary key) |
| | Many to many join |
| Local | Local join vs. non-local join |
| Selectivity | 0- Selectivity between 0% and 10% |
| | ... |
| (Where selectivity is the fraction of records remaining in consideration.) | 9- Selectivity between 90% and 100% |
| Size of Join Output | SMALL - Output size of join less than threshold T |
| | MEDIUM - Output size of join >= T and <10 x T |
| | LARGE - Output size of join >= 10 x T |

TABLE 2-continued

| JOIN CATEGORY | CATEGORY VALUES |
|---|---|
| | (In some implementations, T is 1 or 10 megabytes. Other values of T are possible.) |

Join Ranker

The join ranker 124 generates a numerical rank for each join in a join graph. By using different join rankers, for example, the join order search space 126 of the can be controlled and modified easily. The interface to a particular join ranker 124 is:

Input: A join graph and a partial list of joins (PLJ), in order they are to be performed.

Output: An ordered ranking of all remaining joins within the join graph that are not in the PLJ. In some implementations, the output ranks are totally ordered (i.e. any particular rank is definitively better or worse than any other rank). Each edge is assigned a potentially repeated rank. Thus the edges themselves are not totally ordered (e.g., multiple joins can have the same rank). The output ranking of the joins within a join graph form a set of join trees. The trees that are formed correspond to all trees such that any particular join with rank R is performed after all joins with R'<R and performed before all joins with R''>R. In other words, given a join with a particular rank, it is performed after all joins with lower ranks and before all joins with higher ranks.

Figure 4A:
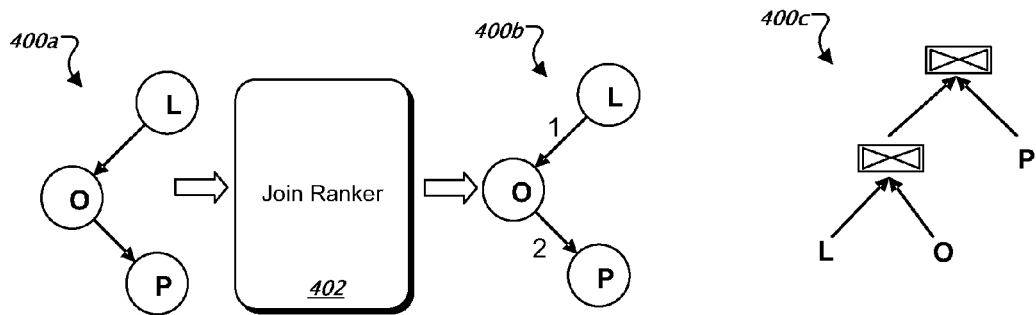
FIGS. 4A-B illustrate examples of join ranking.
Figure 4B:
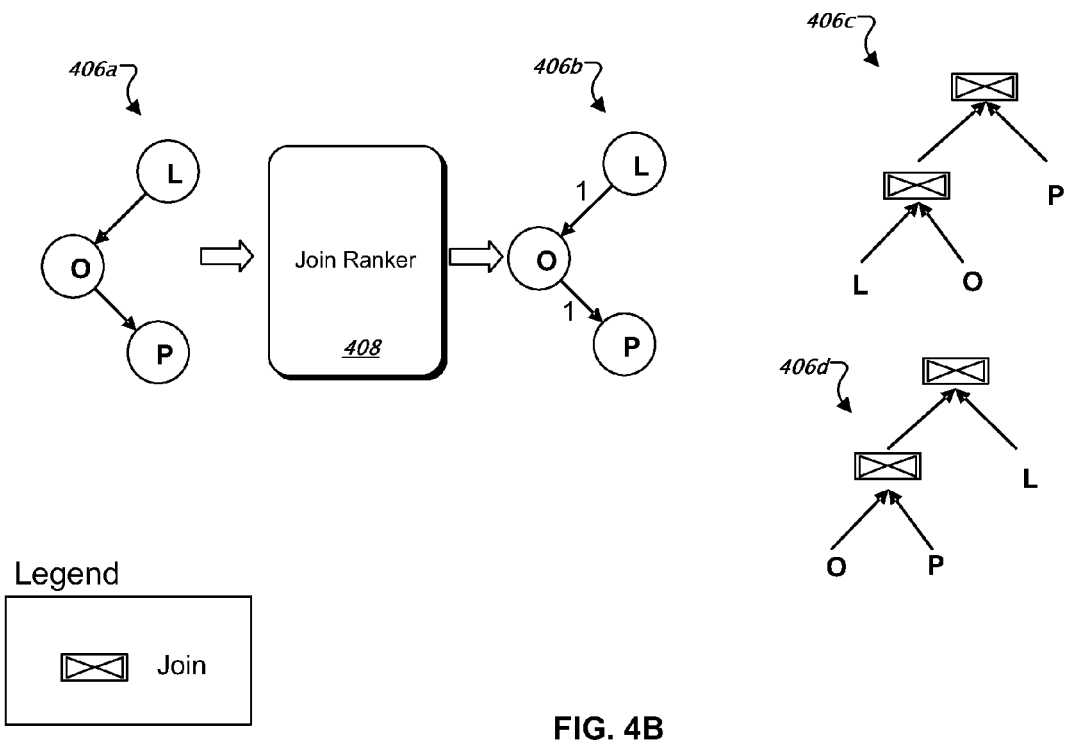

By way of illustration and with reference to FIG. 4A, the join ranker 402 ranks the join between nodes L and O in join graph 400a as '1' and the join between nodes O and P as '2'. This ranking corresponds to the join tree 400b where the L-O join is performed prior to the O-P join. This is reflected in the join order 400c. In FIG. 4B, the join ranker 408 ranks the join tree 406a. The join between nodes L and O is ranked as '1' and the join between nodes O and P as '1', as shown in join tree 406b. This ranking implies two different join trees: one where the join between O-P is done first (406d), and one where the join between L-O is done first (406c)

In various implementations, the join ranker 124 ranks joins according to the following heuristics:

1. The presence of constraints in the join (foreign-key: primary-key or many:1) forms the primary weight $W_{primary}$ (i.e. is the most important factor)—many:1 joins are ranked lower than many:many joins. In some implementations, the value of $W_{primary}$ is 0 for many:1 joins and 1 for many:many joins. Other values of $W_{primary}$ are possible.

2. The selectivity of the join forms the secondary weight $W_{secondary}$ (i.e. the second most important factor)—within a single primary weight category, more selective joins ranked lower than less selective ones. In some implementations, the value of $W_{secondary}$ is between 0 and 9 based on the selectivity of the join. Other values of $W_{secondary}$ are possible.

3. The approximate size of the join forms the tertiary weight $W_{tertiary}$ (i.e. third most important)—within a single primary and secondary weight category, smaller joins are ranked lower than larger joins. In some implementations, the value of $W_{tertiary}$ is: Small=0, Medium=2, Large=8. Other values of $W_{tertiary}$ are possible.

4. For very small joins (defined by a threshold), a quaternary weight is used so as to break ties between joins. For joins that are not very small, $W_{quaternary}=0$. In some implementations, the value of $W_{quaternary}$ is 0 for medium and large size joins, and for small joins, the value of $W_{quaternary}$ is determined by concatenating the join graph vertex indices involved in the join (e.g. the join between vertexes 2 and 4 would get the weight 24).

5. The weights described above are used to calculate a rank using the following formula:

$$10000*W_{primary}+1000*W_{secondary}+100*W_{tertiary}+W_{quaternary}$$

In some implementations, after ranks are calculated, for each local join, for example between nodes n1 and n2, we find the lowest rank of any join involving either node n1 or n2 that would destroy the local property of this join if performed first. Then, the rank of the join is set to the lowest such rank. This ensures that we do not eliminate any local join from being considered during join enumeration.

Join Order Generator

The join order generator 122 uses a distribution-aware narrowing strategy for reducing the search space of candidate plans to consider based on analyzing properties of the data itself (e.g., how it is distributed and relationship cardinalities with other tables) to determine the search space of join orderings to consider. The output of the join order generator is a set of join orders 126. Each join order in the set 126 contains a complete list of joins to perform, in order, and each join is associated with a join operation as well as any data redistribution required. Thus, each join order determines a unique execution plan.

In some implementations, the input and output of the join order generator 122 is as follows:
Input: a join graph, a specific projection set, a join classifier 134, and a join ranker 124.
Output: a set of join orders that can be made into execution plans.

Join plan generation will now be discussed in regards to a specific algorithm. However, other algorithms are possible. Input to the algorithm is a "ranked graph" consisting of a triple, G=(V, E, R) where V is a set of vertices (one for each table in the query represented by join graph 116), E is a set of edges (one for each pair of tables joined in the query represented by join graph 116), and R is the join ranker (e.g., join ranker 124) which, for a given edge e∈E, provides the rank of the join denoted by the edge. The output of the algorithm is a set of join plans, which are denoted algebraically, e.g. ((A x B) x (C x D)), for example. Each join plan is a fully parenthesized ordering of E and thus unambiguously represents a particular join order. Formally, a join plan has the following formal grammar:

JoinPlan :: Table
   |JoinPlan 'x' JoinPlan
   |JoinPlan ';' JoinPlan
For any two join plans, A and B
   A x B joins the results of join plans A and B
   A ; B returns these join plans as separate subplans that are not joined As long as the join graph is connected, no determined join plan will consist of multiple subplan segments, but these segments may be needed for intermediate results. Any disconnected join graph can be made connected in the following algorithm:
Find all disconnected components $C_1 \ldots C_n$
For each component C
   For each node n in C
     Add a cross join edge to every node∉C
ALGORITHM // Generates all JoinPlans from a given join graph and
   ranking function GenJoinPlans (V: {Vertex}, E: {Edge},
   R: Rank Function): {JoinPlan}
BEGIN
IF E={ } THEN RETURN { }
ELSE
   LET S={e \in E|R (e) is maximal in E}
     S={(u1,v1), . . . , (un,vn)}
RETURN
   MergePlans (u1, v1, GenJoinPlans (V, E−{(u1,v1)}, R)))
   UNION . . . .
   MergePlans (un, vn, GenJoinPlans (V, E−{(un,vn)}, R)))
END
ALGORITHM
// returns the set of JoinPlans that result from adding edge
// (u,v) to each JoinPlan in Ps
MergePlans (u: Vertex, v: Vertex, Ps: {JoinPlan}): {JoinPlan}
BEGIN
// Ps={p1, . . . , pm}
RETURN
   {MergePlansAux (u,v,p1), . . . , MergePlansAux (u,v, pm)}
END
ALGORITHM
// Returns the JoinPlan that results from adding edge (u,v)
// to the JoinPlan p
MergePlansAux (u: Vertex, v: Vertex, p: JoinPlan): JoinPlan
BEGIN
IF p=A ; B for some subplans A and B THEN // p has 2 disconnected portions
IF u in one of A or B, and v in the other THEN RETURN A x B
ELSIF u and v both in A, or both in B THEN RETURN A ; B
ELSIF u in A and v not in B THEN RETURN (A x v); B
ELSIF u in B and v not in A THEN RETURN A ; (B x v)
ELSIF v in A and u not in B THEN RETURN (A x u); B
ELSIF v in B and u not in A THEN RETURN A ; (B x u)
ELSE RETURN (A ; B; (u x v))
ELSE
IF u and v both in p THEN RETURN p
ELSIF u in p and v not in p THEN RETURN p x v
ELSIF v in p and u not in p THEN RETURN p x u
ELSE RETURN (p ; (u x v))
END An example execution trace of the GenJoinPlans algorithm is provided as follows.
Suppose we start with RJG such that
V={A,B,C,D,E,F}
E={e1=(A,B),
e2=(B,C),
e3=(C,D),
e4=(D,F),
e5=(D,E)}, and
R (e1)=1, R (e2)=2, R (e3)=2, R (e4)=3, and R (e5)=3
Tracing Execution:

---

R = GenJoinPlans (V,{e1,e2,e3,e4,e5},R)
  = MergePlans (D,F,P1) UNION MergePlans (D,E,P2)
s.t.
  P1 = GenJoinPlans (V,{e1,e2,e3,e5},R) and -continued

```
P2 = GenJoinPlans (V,{e1,e2,e3,e4},R)
P1 = GenJoinPlans (V,{e1,e2,e3,e5},R)
  = MergePlans (D,E,P3)
    s.t.
    P3 = GenJoinPlans (V,{e1,e2,e3},R)
      = MergePlans (B,C,P4) UNION MergePlans (C,D,P5)
        s.t.
        P4 = GenJoinPlans (V,{e1,e3},R) and
        P5 = GenJoinPlans (V,{e1,e2},R)
        P4 = GenJoinPlans (V,{e1,e3},R)
          = MergePlans (C,D,P6)
            s.t.
            P6 = GenJoinPlans (V,{e1},R)
              = MergePlans (A,B,P7)
                s.t.
                P7 = GenJoinPlans (V,{ },R)
                  = { }
              = MergePlans (A,B,{}) = {(A × B)}
          = MergePlans (C,D,{(A × B)})
          = {MergePlanAux (C,D,(A × B))}
          = {(A × B) × (C × D)}
        P5 = GenJoinPlans (V,{e1,e2},R)
          = MergePlans (B,C.P6)
          = MergePlans (B,C,{(A × B)})
          = {MergePlanAux (B,C,(A × B))}
          = {(A × B) × C}
      = MergePlans (B,C,{(A × B) × (C × D)}) UNION MergePlans
(C,D,{(A × B) × C})
        = {MergePlanAux (B,C,(A × B) × (C × D), MergePlanAux
(C,D,(A × B) × C)}
        = {(A × B) × (C × D), ((A × B) × C) × D}
    = MergePlans (D,E,{(A × B) × (C × D), ((A × B) × C) × D})
    = {MergePlanAux (D,E,(A × B) × (C × D)), MergePlanAux (D,E,((A ×
B) × C) × D)}
    = {(A × B) × ((C × D) × E), (((A × B) × C) × D) × E}
  P2 = GenJoinPlans (V,{e1,e2,e3,e4},R)
    = MergePlans (D,F,P3)
    = MergePlans (D,F,{(A × B) × (C × D), ((A × B) × C) × D})
    = {MergePlanAux (D,F,(A × B) × (C × D)), MergePlanAux (D,F,((A ×
B) × C) × D)}
    = {(A × B) × ((C × D) × F), (((A × B) × C) × D) × F}
  = MergePlans (D,F,P1) UNION MergePlans (D,E,P2)
  = MergePlans (D,F,{(A × B) × ((C × D) × E), (((A × B) × C) × D) × E})
  UNION
  MergePlans (D,E,{(A × B) × ((C × D) × F), (((A × B) × C) × D) × F})
  = {MergePlanAux (D,F,(A × B) × ((C × D) × E)), MergePlanAux (D,F,(((A
× B) × C) × D) × E)}
  UNION
  {MergePlanAux (D,E,(A × B) × ((C × D) × F)), MergePlanAux (D,E,(((A
×
B) × C) × D) × F)}
  = {(A × B) × (((C × D) × E) × F), ((((A × B) × C) × D) × E) × F}
  UNION
  {(A × B) × (((C × D) × F) × E), ((((A × B) × C) × D) × F) × E}
  = {(A × B) × (((C × D) × E) × F),
     ((((A × B) × C) × D) × E) × F,
     (A × B) × (((C × D) × F) × E),
     ((((A × B) × C) × D) × F) × E}
```

In some implementations, a choice is made as to which of two relations should be the inner relation of a join and which should be the outer. For example, if the outer (left) input to the join operator is 'large' and that the inner (right) input is 'small', then the join may perform better on some systems than if the inputs were the other way around. Similarly, if the inner (right) input is unique on the join key, the join performs better than if it were not. Thus when creating join orders, the join order generator 122 can take these factors into account when choosing the outer and inner relations, and tries the larger, as well as the "many" side of a many:1 join, as the outer relation.

Joins and Data Redistribution

In order to perform join operations in an environment where data is distributed over multiple sites in one or more computer networks, the optimizer can use the join operators listed in TABLE 3 when creating join orders in various implementations. Other join operators are possible, however. An example of another join operator is one that simply broadcasts NULL rows to all sites but leaves non NULL rows at the same site.

TABLE 3

| OPERATION | DESCRIPTION |
|---|---|
| Local Join | Join performed in parallel at all sites. Requires that any rows from the inner relation that could possible join with rows from the outer relation are co-located at the same sites. The union of all tuples across all sites from the actual outer relations fed to the joins are exactly the tuples of the logical input relation. There can be no duplicates or missing rows. |
| Re-segment (on expression A) | Repartitions all tuples to some other sites in the cluster according to an expression A. At the end of the re-segment operation, every tuple from the input relation is on exactly one site. For example, in FIG. 4C X and Y are re-segmented on expression A before a local join. The result is segmented on A. |
| Broadcast | Broadcasts all tuples such that every other site in the cluster contains an entire copy of the input relation, regardless of how the input relation was originally distributed across the cluster. By way of illustration, FIG. 4D illustrates a join plan that broadcasts Y before a local join to X. The result is segmented identically to X. |
| Local Filter (on expression A) | The output of this operation is the same as if re-segment on the expression was used. Local Filter can only be used when the input relation is replicated. The operator locally filters out those rows which would not be present on the site were the relation Re-segmented by the specified expression. |

This section enumerates which distributed join operations are considered. In some implementations, it is assumed that the choice of which of the two possible join inputs will be the outer and which will be the inner has already been made. For each possible combination of input distributions, join type and join predicate, the join order generator 122 considers which distributed operations to apply to each input. Depending on the choice, the distribution of the output of the join will be either segmented or replicated. The full search space consists of all the possible choices of distributed operation pairs that produce semantically correct results.

TABLE 4 below enumerates the possible choices considered by the join order generator 122. The number of choices is not exhaustive. In some implementations, the choices have been limited by the following restrictions:

When the join (INNER, LEFT OUTER, FULL OUTER) has at least one equality predicate, operations are applied to the inputs such that they become segmented according to the equality predicates used to join them.

When the join has no equality predicates, operations are applied to make the following true:

INNER: One input is segmented to the join operator and the other is replicated;

LEFT OUTER: The outer input to the join operator is segmented and inner input to the join operator is replicated; and FULL OUTER: The inputs to the join operator are replicated (i.e., the join is performed on one site).

The possible input distributions for a projection:
Replicated all sites (Rep);
Replicated on some sites (Rep*);
Segmented on Join Keys (Seg_JK); and
Segmented not on Join Keys (Seg) i.e. any arbitrary segmentation.

Possible Join Types

Inner;

LEFT Outer (also Semi/Anti), and

FULL Outer.

Possible Join Predicates:

At least one equality join predicate. Join predicates are assumed to be connected by AND.

Other join predicates (e.g., OR, NOT) are handled generically as ON clause predicates.

Possible Distributed Operations:

None/Local=(L);

Re-segment according to JoinKey=(R);

Broadcast=(B); and

Filter on JoinKey (turns Rep→Seg_JK)=(F)

Each entry in TABLE 4 contains one or more entries such as the following: (Op1,Op2)→Result Distribution. This is interpreted as applying distributed operation Op1 to the OUTER input and applying distributed operation Op2 to the INNER input before performing the join. The Result Segmentation is how the join output is distributed (Segmented or Replicated). If Replicated, it represents the sites on which the join could produce output. A separate phase can be used to determine the actual sites necessary for execution.

tribution is not present on all sites, the data can be re-segmented to all sites to more evenly distribute the processing load.

Cost Predictor

Once the join order generator 122 has created candidate plans 126 based on the heuristics above, a plan is selected for execution by the cost predictor 128. In some implementations, the plan that is selected is the one with the lowest cost. The cost predictor 128 is modular in that it is configured by provided cost model 130. Different cost models are possible and the cost predictor 128 is not dependent on any single cost model for its operation.

In some implementations, the cost model 130 calculates cost using a path or order that represents an execution plan. For each path, the formulas in TABLE 5 specify how to calculate an aggregate cost that represents an estimated overall execution time to execute the path, an estimated number of rows that will be produced by the path, and an estimated number of compressed rows that will be produced. Other formulas are possible, however.

TABLE 4

Distributed Operations Considered by the Join Order Generator

| OUTER Distribution | INNER Distribution | JOIN w/ Equality Predicates (INNER, LEFT OUTER, FULL OUTER) | JOIN without Equality Predicates | | |
|---|---|---|---|---|---|
| | | | INNER | LEFT OUTER | FULL OUTER |
| Rep | Rep | (F,F) -> Seg<br>(L,L) -> Rep | (F,L) -> Seg<br>(L,F) -> Seg<br>(L,L) -> Rep | (F,L) -> Seg<br>(L,L) -> Rep | (L,L) -> Rep |
| Rep | Seg_JK | (F,L) -> Seg<br>(L,B) -> Rep | N/A (No Join Keys) | N/A (No Join Keys) | N/A (No Join Keys) |
| Rep | Seg | (F,R) -> Seg<br>(L,B) -> Rep | (L,L) -> Seg<br>(L,B) -> Rep | (F,B) -> Seg<br>(L,B) -> Rep | (L,B) -> Rep |
| Seg_JK | Rep | (L,F) -> Seg<br>(B,L) -> Rep | N/A (No Join Keys) | N/A (No Join Keys) | N/A (No Join Keys) |
| Seg_JK | Seg_JK | (L,L) -> Seg<br>(L,R) -> Seg,<br>(R,L) -> Seg<br>(B,B) -> Rep | N/A (No Join Keys) | N/A (No Join Keys) | N/A (No Join Keys) |
| Seg_JK | Seg | (L,R) -> Seg<br>(B,B) -> Rep | N/A (No Join Keys) | N/A (No Join Keys) | N/A (No Join Keys) |
| Seg | Rep | (R,F) -> Seg<br>(B,L) -> Rep | (L,L) -> Seg<br>(B,L) -> Rep | (L,L) -> Seg<br>(B,L) -> Rep | (B,L) -> Rep |
| Seg | Seg_JK | (R,L) -> Seg<br>(B,B) -> Rep | N/A (No Join Keys) | N/A (No Join Keys) | N/A (No Join Keys) |
| Seg | Seg | (R,R) -> Seg<br>(B,B) -> Rep | (L,B) -> Seg,<br>(B,L) -> Seg<br>(B,B) -> Rep | (L,B) -> Seg<br>(B,B) -> Rep | (B,B) -> Rep |

TABLE 4 assumes that any replicated distribution is on all sites as its other input ("locally joinable"). When this is not the case, the distributed operations on replicated inputs can be modified according to the following rules:

If the output is replicated: Local (L) is changed to Broadcast (B), and the filter (F) is changed to re-segment (R); and If the output is segmented: Local (L) is changed to re-segment (R) (if equality predicates are present) or Broadcast (B) (if equality predicates are not present), and the filter (F) is changed to re-segment (R).

In some implementations, if a segmented on join keys (Seg_JK) distribution is not be present on all sites, we do not consider re-segmenting to all sites in this case. In further implementations, if a segmented on join keys (Seg_JK) dis-

TABLE 5

| FORMULA | DESCRIPTION |
|---|---|
| $S_{row}$ | The size of row (in bytes). |
| $N_{row}$ | An estimated row count. |
| $N_{sites}$ | The number of sites to send output to. |
| R | The ratio of the time it takes to re-segment data compared to the time required to send data across the network. |
| $S_{row} \cdot N_{row} \cdot N_{sites}$ | The cost to use a broadcast operator. |
| $S_{row} \cdot N_{row} \cdot R$ | The cost to use a re-segment operator. |
| ndv(r, a) | The number of distinct |

TABLE 5-continued

| FORMULA | DESCRIPTION |
|---|---|
| innerCard | values of attribute a in the relation r. The cardinality of the inner input join. |
| outerCard | The cardinality of the outer input join. |
| $\text{card} = \dfrac{\text{innerCard} \cdot \text{outerCard}}{\max(\text{ndv}(\text{outer, a}), \text{ndv}(\text{inner, a}))}$ | The cardinality of single-column join (e.g. outer.a = inner.a) (standard formula). |
| $\text{card} = \dfrac{\text{innerCard} \cdot \text{outerCard}}{\max(\text{ndv}(\text{outer, a}), \text{ndv}(\text{inner, a})) \cdot x}$; $x = \max(\text{ndv}(\text{outer, b}), \text{ndv}(\text{inner, b}))$ | The cardinality of M:N multi-column join (e.g. outer.a = inner.a AND outer.b = inner.b). |
| Cost = input cost · input weights + distribution costs + late materialization cost<br>Where:<br>Input cost is an estimate of the cost to read in columns from storage.<br>Input weights are weights assigned to each join input type (e.g., INNER input for MergeJoin, OUTER input for MergeJoin, OUTER input to HashJoin, and INNER input to HashJoin).<br>Distribution costs are the distribution costs for each input to the join (e.g., the number of bytes in a row multiplied by card and a weight depending on whether the input is re-segmented, filtered or a number of sites for broadcast).<br>Late materialization cost is the sum of the costs for all columns being materialized. | The estimated cost of either type of join (e.g., inner or outer). |

Figure 5:
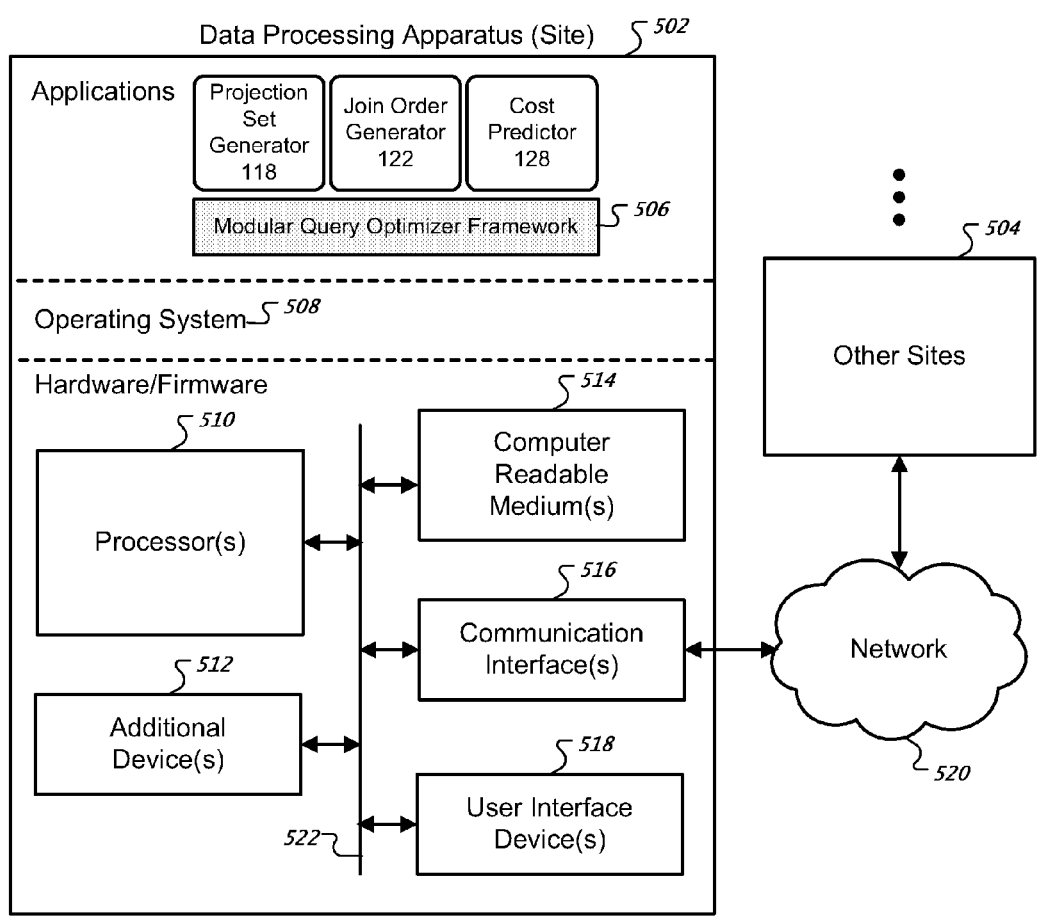
FIG. 5 is a schematic diagram of an example data processing apparatus programmed to implement a modular query optimizer.

FIG. 5 is a schematic diagram of an example data processing apparatus 502 programmed to implement a modular query optimizer. The data processing apparatus 502 is an example of a site in a cluster of other sites 504 connected by communication network 520 (e.g., the Internet). The hardware/firmware of the data processing apparatus 502 includes one or more processors 510 (e.g., microprocessors) having one or more processing cores for fetching and executing instructions in order to perform operations which implement computer programs. The processors 510 are coupled to a data communication bus 522 which allows the processors 510 to interact with various computer readable mediums (514) for fetching computer program instructions and data, and for storing data. The one or more computer readable mediums 514 (e.g., random access memory, hard disks, and FLASH memory) store data and instructions that implement applications such as the projection set generator 118, the join order generator 122, the cost predictor 128, the join classifier 134, the join ranker 124, and various cost models such as cost model 144 and cost model 130. The computer readable mediums 514 additionally include data and instructions for implementing a modular query optimizer framework 506, describe further below. Also coupled to the bus 522 are communication interfaces 516 such as, for example, network interfaces (e.g., Ethernet interfaces) for sending and receiving data over the network 520, and user interface devices such as displays, keyboards, mice, and so on. An optional operating system 508 manages programmatic access to the hardware resources described above and provides libraries or other computer software to allow the executing applications (e.g., projection set generator 118, join order generator 122, and cost predictor 128) to utilize the hardware resources and communicate with other sites 504. The data processing apparatus 502 can include additional devices 512 coupled to the bus 522 such as, for example, specialized input/output devices and processors.

In some implementations, the modular query optimizer framework 506 is an application programming library that fulfills requests from the applications (118, 122, 128) for cost models (e.g., 130 and 144), join classifiers and rankers (e.g., 134 and 124). For example, as part of their initiation, the executing applications (118, 122, 128) can request cost models, join classifiers, and rankers according to configuration information for the applications. In further implementations, the framework 504 can itself be an executing application that is configured to receive requests for cost models, classifiers, or rankers from the applications (118, 122, 128) and provides the requested components in response. Other types of frameworks are possible. The cost models, classifiers and rankers can be implemented as compiled application libraries, Object Oriented Programming (OOP) objects, or merely as sets of parameters, for instance.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A computer-implemented method comprising:
   for each table in a database query, selecting one or more projections that reduce an estimated cost for executing the query for the table, based on a segmentation or sort order of the selected projections;
   based on a data distribution of one or more of the selected projections among sites in a computer network, generating, for the query, possible join orders that represent different combinations of data distribution operations applied to the outputs of one or more of the query's joins; and
   evaluating the join orders based on a cost model.

2. The method of claim 1 wherein the estimated execution cost for the query is based on whether the selected projections allow for one or more local joins in an execution plan for the query.

3. The method of claim 1 wherein, in a join order, many-to-one joins occur before many-to-many joins.

4. The method of claim 1 wherein, in a join order, more selective joins occur before less selective joins.

5. The method of claim 1 wherein, a local join in a join order that occurs before a subsequent join that would destroy the locality of the local join is given the same order as the subsequent join.

6. The method of claim 1 wherein a data distribution operation is at least one of: re-segmentation according to a join key, broadcast, and filtering on a join key.

7. The method of claim 1 also comprising selecting a join order based on the evaluation.

8. The method of claim 7 in which selecting a join order further comprises selecting the join order with the lowest cost.

9. A computer program product, encoded on a computer-readable storage medium, including instructions operable to cause data processing apparatus to perform operations comprising:
   for each table in a database query, selecting one or more projections that reduce an estimated cost for executing the query for the table, based on a segmentation or sort order of the selected projections;
   based on a data distribution of one or more of the selected projections among sites in a computer network, generating, for the query, possible join orders that represent different combinations of data distribution operations applied to the outputs of one or more of the query's joins; and
   evaluating the join orders based on a cost model.

10. The program product of claim 9 wherein the estimated execution cost for the query is based on whether the selected projections allow for one or more local joins in an execution plan for the query.

11. The program product of claim 9 wherein, in a join order, many-to-one joins occur before many-to-many joins.

12. The program product of claim 9 wherein, in a join order, more selective joins occur before less selective joins.

13. The program product of claim 9 wherein, a local join in a join order that occurs before a subsequent join that would destroy the locality of the local join is given the same order as the subsequent join.

14. The program product of claim 9 wherein a data distribution operation is at least one of: re-segmentation according to a join key, broadcast, and filtering on a join key.

15. The program product of claim 9 wherein the operations also comprise selecting a join order based on the evaluation.

16. The program product of claim 15 in which selecting a join order further comprises selecting the join order with the lowest cost.

* * * * *